United States Patent [19]

Schanin et al.

[11] Patent Number: 5,067,071
[45] Date of Patent: Nov. 19, 1991

[54] MULTIPROCESSOR COMPUTER SYSTEM EMPLOYING A PLURALITY OF TIGHTLY COUPLED PROCESSORS WITH INTERRUPT VECTOR BUS

[75] Inventors: David J. Schanin, Sudbury; Russel L. Moore, Hudson; John R. Bartlett, Acton; Charles S. Namias, Burlington; David W. Zopf, Marlboro, all of Mass.; Brian D. Gill, Londondery, N.H.; Trevor A. Creary; Stephen S. Corbin, both of Natick, Mass.; Mark J. Matale, Sterling, Mass.; David F. Ford, Boston, Mass.; Steven J. Frank, Westboro, Mass.

[73] Assignee: Encore Computer Corporation, Fort Lauderdale, Fla.

[21] Appl. No.: 706,142

[22] Filed: Feb. 27, 1985

[51] Int. Cl.$^5$ .................................. G06F 9/46
[52] U.S. Cl. .............................. 395/275; 364/230.2; 364/232.7; 364/241.2; 364/242.92; 364/229.2; 364/DIG. 1
[58] Field of Search ... 364/200 MS File, 900 MS File

[56] References Cited

U.S. PATENT DOCUMENTS

| | | | |
|---|---|---|---|
| 3,566,363 | 2/1971 | Driscoll, Jr. | 340/172.5 |
| 3,665,404 | 5/1972 | Werner | 364/200 |
| 3,710,324 | 1/1973 | Cohen | 364/200 |
| 4,040,028 | 8/1977 | Pauker et al. | 364/200 |
| 4,130,865 | 12/1978 | Heart et al. | 364/200 |
| 4,141,067 | 2/1979 | McLagan | 364/200 |
| 4,190,885 | 2/1980 | Joyce | 364/200 |
| 4,229,791 | 10/1980 | Levy et al. | 364/200 |
| 4,275,458 | 6/1981 | Khera | 364/900 |
| 4,349,871 | 9/1982 | Lary | 364/200 |
| 4,400,773 | 8/1983 | Brown | 364/200 |
| 4,414,624 | 11/1983 | Summer | 364/200 |
| 4,417,302 | 11/1983 | Chimienti | 364/200 |
| 4,420,806 | 12/1983 | Johnson | 364/200 |
| 4,439,829 | 3/1984 | Tsiang | 364/200 |
| 4,504,902 | 3/1985 | Gallaher | 364/200 |
| 4,513,390 | 4/1985 | Walter | 364/900 |
| 4,539,637 | 9/1985 | De Bruler | 364/200 |
| 4,562,535 | 12/1985 | Vincent | 364/200 |
| 4,570,217 | 2/1986 | Allen et al. | 364/200 |
| 4,591,976 | 5/1986 | Webber et al. | 364/200 |
| 4,604,694 | 8/1986 | Hough | 364/200 |
| 4,805,106 | 2/1989 | Pfeifer | 364/200 |

OTHER PUBLICATIONS

*IBM Technical Disclosure Bulletin*, vol. 26, No. 7A, Dec. 1983, "Method for Decreasing Arbitration Overhead," by Bergey, et al. pp. 3370-3371.
*IEEE Transactions on Computers*, vol. C-34, No. 1, Jan. 1985, "Data Coherence Problem in a Multicache System", by Yen et al, pp. 56-65.

*Primary Examiner*—Lawrence E. Anderson
*Attorney, Agent, or Firm*—Henry D. Pahl, Jr.

[57] ABSTRACT

Disclosed is a multiprocessor computer system including a plurality of processor modules with each of the processor modules including at least one processor and a cache memory which is shared by all of the processors of each processor module. The processor modules are connected to a system bus which comprises independent data, address, vectored interrupt, and control buses. A system memory which is shared by all the processor modules is also connected to the buses, and the cache memories in each processor module store those memory locations in the main memory most frequently accessed by the processors in its module. A system control module controls the operation and interaction of all of the modules and contains the bus arbiters for the vector, data and address buses. The system control module also controls the retrying of requests which are not completed and should any requester fail to obtain access to a bus, the system control module also unjams this deadlock. Each of these multiprocessor computer systems can be connected to another multiprocessor computer system through an interface which includes a cache for housing frequently accessed locations of the other multiprocessor system.

3 Claims, 9 Drawing Sheets

| BUS CYCLES | 1 | 2 | 3 | 4 | 5 | 6 | 7 | 8 | 9 | 10 |
|---|---|---|---|---|---|---|---|---|---|---|
| ADDRESS BUS ARBITER | REQ GRANT #1 | REQ GRANT #2 | | | | | | | | |
| DATA BUS ARBITER | | | | | | READ DATA READY | | | | |
| ADDRESS BUS | | READ ADDR #1 | WRITE ADDR #2 | | | | | | | |
| DATA BUS | | | | WRITE DATA #2 | | | READ DATA #1 | | | |
FIG. 8
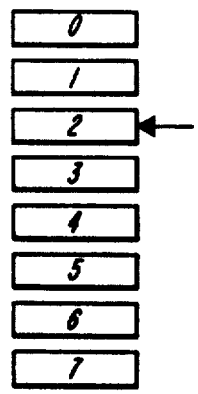
FIG. 9A
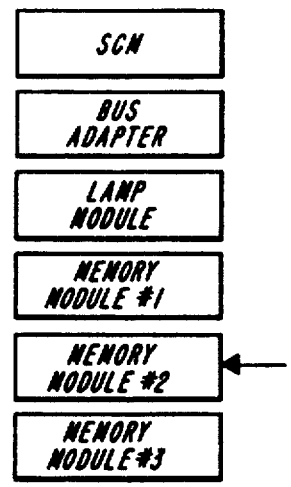
FIG. 9B

MULTIPROCESSOR COMPUTER SYSTEM EMPLOYING A PLURALITY OF TIGHTLY COUPLED PROCESSORS WITH INTERRUPT VECTOR BUS

BACKGROUND OF THE INVENTION

This invention relates to multiprocessor computer systems and more particularly, to such a system including a plurality of tightly coupled processors.

Current developments in the computer industry have caused an ever increasing trend towards larger and more sophisticated computing systems. These developments have in many cases been made possible by higher speed and less expensive circuit elements. Further increases in system throughput have come from improved organization of the computing systems. Of particular note in terms of organization is the multiprocessor computing systems wherein several autonomous processing units are capable of sharing a common workload.

Over the years many different types of multiprocessor configurations have been designed. In fact, many mainframe vendors and some minicomputer suppliers currently offer systems with two to four processors. To date, these structures have been expensive to build due to the high cost of the typical processors. Therefore, multiprocessor computer systems have found application mostly for high-availability computing (e.g., communications, banking, airline reservations).

Another purpose of providing multiprocessor arrangements is to increase computational power and speed by employing a plurality of processing units which operate in parallel so as to obtain a data throughput greater than that achievable by a single processor operating at any achievable speed. Many algorithms and computations typically handled by digital computers can be parallel processed. Further, since the cost of increasing processor speed increases sharply beyond a predetermined point, it can be shown that throughput above a corresponding level can be achieved more economically by employing a greater number of relatively slow processors than by increasing the speed of a single processor. In view of the rapid rate of microprocessor evolution, the number of sensitive applications requiring single-stream performance in excess of that delivered by a single processor is already quite small and will continue to shrink.

Some of the advantages gained through the use of multiprocessors are achieved at the expense of incurring considerable penalty in terms of system reliability and increased difficulty in programming. The shortcomings are typically due to hierarchical organization of the processors. One characteristic often contributing to reliability problems was the usual organizational arrangement where each communications or input/output device was associated with a given one of the processors. A failure in that one processor would cause the entire system to be unable to fulfill its overall intended purpose.

Typical multiprocessor systems are coupled in one of two ways. In a "closely-coupled" multiprocessor system, each processor runs in a closed computing environment consisting of a processor, a private memory, an I/O interface, and a separate operating system. Flexibility and power are restricted in such a system because each processor is as isolated as it would be if it were an independent system in a fast network. In addition, more than one processor cannot efficiently be applied to the same task without large amounts of data and context being transferred each time a switch is made. Thus a limit is placed on how dynamically the pool of processors can be balanced to a quickly changing task load.

In a tightly coupled system, multiprocessors share a common bus, memory, input/output devices and an operating system. In such an architecture, only one copy of the operating system is needed for hundreds of processes running on a large number of individual microprocessors. All processors—and processes—share access to all of main memory, all network and I/O interfaces, and all of mass storage. This sharing allows maximum utilization of available processors with minimum waste of memory space and bus bandwidth because shared access requires minimum copying of data and minimum context switching. In such a system, any processor can be used at any time for any process. The enormous flexibility of this design pays off in greater available power, greater expansion potential, and a much wider range of applications.

There are various considerations that should be taken into account when designing a multiprocessor system in order to obtain the maximum performance level. One such factor is that a given vendor should provide a fairly large variety of multiprocessor systems. This variety should take into account both performance and price considerations. Having to choose among a limited number of computer family members is often not a satisfactory solution since it is expensive to design and develop different computer family members.

Another important consideration in the design of a multiprocessor computer system is that when the system is designed from a number of different type of modules such as processors, I/O devices, and memory modules, the failure of one such module should not result in failure of the multiprocessor computer system. Ideally, appropriate software support should allow faulty modules to be replicated and taken out of service thereby allowing continuing operation with minimum down time.

In order to keep design costs of a multiprocessor system as low as possible, it is important that the multiprocessor computer system is not comprised of a large number of unique boards in a typical minicomputer. Instead, if the multiprocessor computer system is comprised of multiple copies of a small number of modules the system is faster and less expensive to design, and individual module types can be produced in large volumes, producing improvements in manufacturing costs over older technologies.

In any multiprocessor system in which performance and flexibility are of the utmost importance, the bus which connects the various modules of the system must have a very high data transfer rate. Such a system must also be able to fairly arbitrate access to the bus so that no module is continuously denied access. To achieve a high data transfer rate, it is also generally preferred that the bus be a pended bus, i.e. a bus with a structure which allows requests for information to be disassociated in time from the replies they generate. Pending of operations allows a number of relatively slow devices (e.g. processors) to communicate with other slow devices (e.g. main memory banks) without compromising the bandwidth of a bus designed to accomodate higher speed transfers than any single device can manage by itself. When requests are pended, they are tagged with the requestor's ID and sent to the recipient at the first opportunity. When the recipient replies at some later time, the reply is tagged with the requestor's ID. Neither participant in the transaction is aware that many other transactions involving other requestors and recipients may have intervened between the request and its reply.

In any computer system containing more than one processor there is also the requirement that any processor be able to perform atomic test and set operations on memory. One obvious way to insure atomicity is to tie up the path to memory, i.e., the bus, for an entire read-modify-write operation. In a performance sensitive system, this is clearly undesirable. On a pended bus, i.e., a bus where read cycles are interleaved with other bus operations, the path to memory cannot be tied up. The result is that an external method is required to lock a memory location. Since the memories of the present invention are interleaved on a bank basis, it will be possible to lock memory on a bank by bank basis. Given the size of the memory bank, however, locking memory on four megabyte boundaries is very undesirable.

It is therefore a principle object of the present invention to provide a multiprocessor computer system which includes a large number of processors.

Another object of the present invention is to provide a multiprocessor computer system in which the multiple processors are tightly coupled.

Yet another object of the present invention is to provide a multiprocessor computer system in which a user can construct a correct level of performance or price, without having to choose among a limited number of computer family members.

Still another object of the present invention is to provide a multiprocessor computer system which possesses inherent reliability achieved through the use of a small number of module types which can be taken out of service without affecting the remainder of the system.

A further object of the present invention is to provide a multiprocessor computer system which can transfer vectored interrupts without tying up the data and/or address buses.

A still further object of the present invention is to provide a multiprocessor computer system which includes multiple copies of a small number of modules.

Yet another object of the present invention is to provide a multiprocessor computer system which can be expanded by being interconnected with another similar multiprocessor computer system.

Still another object of the present invention is to provide a multiprocessor computer system which includes a system bus with a very high data transfer speeds.

Another object of the present invention is to provide a multiprocessor computer system which includes a memory system which can perform atomic test and set operations without tying up the system bus.

SUMMARY OF THE INVENTION

The multiprocessor computer system of the present invention comprises one or more copies of a number of distinct modules. A processor module contains at least one processor, which can independently interact with the remaining components of the system. A system can comprise a number of these modules. The system handles a failure of one of these modules or of a processor on one of these modules by logically removing the module or processor from the system. Each of these processor modules also include a cache memory which stores frequently referenced instructions and data. The cache greatly reduces data access time, and as a result of the fewer requests being sent over the bus, the bus traffic is significantly reduced. The cache can be either a write-through cache or a non-write-through cache.

Memory modules, which are shared by all of the processors on the processor modules, provide at least one independent bank of random access memory chips. Each module supports at least four way interleaving between modules thereby allowing the memory modules to run at the maximum bus speed.

The key element of the multiprocessor computer system is the system bus which connects all of the modules of the system to each other. This bus actually comprises four separate buses: data, address, vector and control buses. Communications across these buses are pended and the parallel, pipelined communications sent along these buses enable the system bus to support high data transfer rates. In the preferred embodiment, the system bus supports a 100 Mbyte per second transfer rate.

The system control module functions as the communications clearing house, bus coordinator and diagnostic center for the multiprocessor computer system for the present invention. It is the system control module which includes the bus arbiters for the vector, data and address buses. The system control module also includes the system clock which is used by all of the modules in the system. The address bus arbiter aids in the reduction of bus contention problems by providing for an automatic RETRY of any read or write request which was not completed because the targeted device could not accept the request. An UNJAM feature prevents data returning from the memory from being locked off the shared, read-write data bus by the existence of a large number of consecutive write operations.

A multiprocessor system of the present invention may also include Ethernet/mass storage modules as well as an adapter to an industry standard bus such as the VMEbus.

The multiprocessor computer system can be linked to other multiprocessor computer systems through a large array multiprocessor (LAmP) interface module. This LAmP interface module may include a cache memory which may act in a manner similar to that of the cache memory included on each of the processor modules. The bus arbiters treat any requests arriving on the bus through the LAmP interface module similarly to any other request coming from another module connected to the bus.

These and other features and objects of the present invention will be better understood from the following detailed description which should be read in light of the accompanying drawings in which corresponding reference numbers refer to corresponding parts in the several views.

BRIEF DESCRIPTION OF THE DRAWINGS

FIG. 8 is a timing diagram of READ and WRITE operations across the bus of the multiprocessor system shown in FIG. 1;

FIG. 9a is a diagrammatic view of various modules of the present system utilized in an example of the address bus arbitration scheme of the multiprocessor system shown in FIG. 1;

FIG. 9b is a diagrammatic view of various modules of the multiprocessor computer system of the present invention which are utilized in an example describing the data bus arbitration scheme of the multiprocessor computer system shown in FIG. 1;

DETAILED DESCRIPTION OF THE PREFERRED EMBODIMENTS

Figure 1:
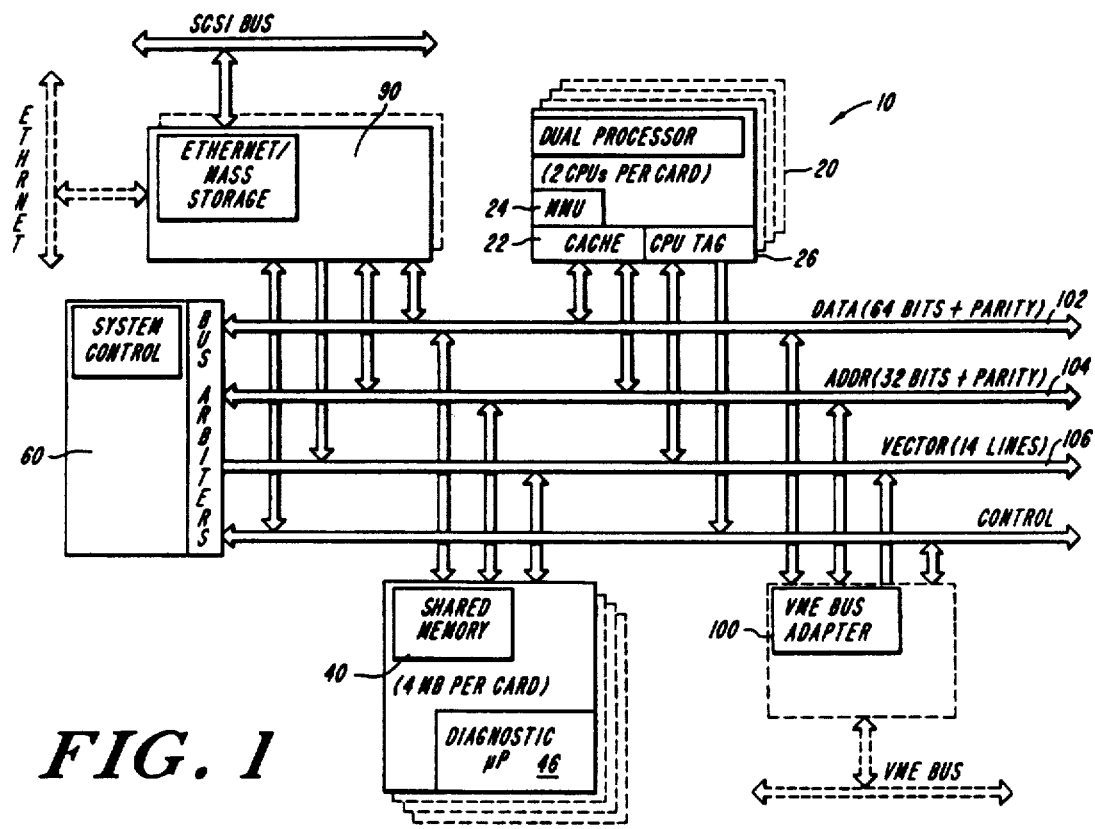
FIG. 1 is a block diagram showing the various components of the multiprocessor computer system according to the present invention.

The multiprocessor computer system of the present invention combines modular processing power, high-speed shared memory and configural I/O capacity to a single computer product which can possess power ranging from microcomputers to mainframes. As shown in FIG. 1, the multiprocessor system 10 includes four basic module types: processor modules 20, shared memory modules 40, a system control module 60, and Ethernet/Mass Storage modules 90.

Figure 2:
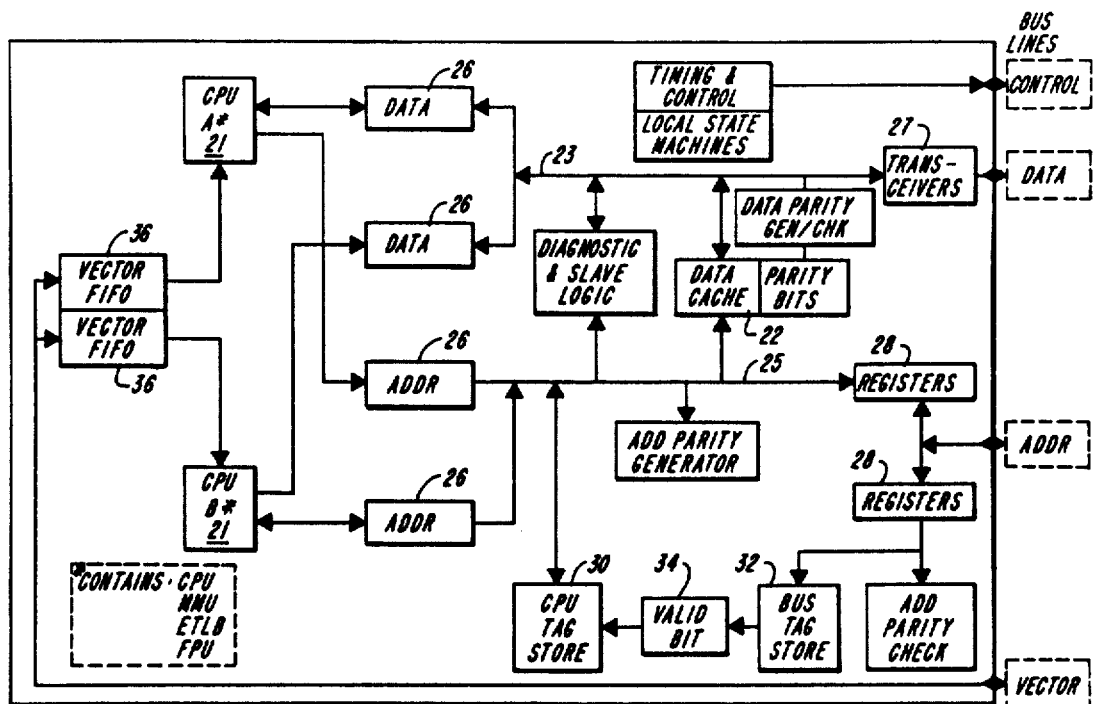
FIG. 2 is a block diagram of the components of a processor module of the multiprocessor system shown in FIG. 1.

The processor module 20 shown in FIG. 2 preferably includes two independent 10 MHz NS32032 processors 21 and one shared cache memory 22. Each processor module 20 is provided with a memory management unit 24 that enables the generation of 32-bit physical addresses. The two processor also share a 32-bit internal data bus (IDB) 23 and a 32-bit internal address bus (IAB) 25. The IDB 23 and IAB 25 are buffered from the processors 21 by CPU data and address transceivers and registers 26, and they are buffered from the system bus 100 through bus data transceivers 27 and address registers 28.

The cache 22 is provided to decrease memory access time by storing frequently referenced instructions and data in a large (32K byte) bank of high-speed static RAM. Memory data is usually written into a cache 22 whenever main memory locations are read or written to by either of the two processors in a given dual processor module 20. An index of the addresses of the locations thus stored is kept in a CPU Tag memory array 30. Thereafter, any effort to access those locations in main memory 40 will result in the access of the of the same data in cache 22. Cache accesses do not generate the processor wait states incurred by main memory accesses since the processor making the request does not have to compete with processors in other processor modules 20 for access to main memory. Rather, the data is simply passed over the internal bus 23 of the processor module 20. In the presently preferred embodiment the hit rate averages over 90%.

The cache 22 for any given processor module 20 is kept current with relevant changes in main memory (generated by writes from other system devices) by means of Bus Tag logic. This logic continuously scans the system bus 30 for memory activity from other system modules involving locally-cached addresses. When such writes are encountered, the Valid Bit 34 for that cache address is switched to its invalid state thereby indicating that cached data in that location no longer corresponds to its associated main memory location As a result, when an onboard processor next needs data from that cache address it will recognize that the associated cache entry is now invalid. The processor will then go to main memory rather than the cache 22 for that data. This action will automatically update the entry in the cache 22. Since the Bus Tag store 32 is independent of the CPU Tag store 30 and replicates this data, maintaining cache currency through bus monitoring can occur without impacting speed of access to the cache by the CPUs.

The cache 22 can be designed as either a write-through cache or a non-write-through cache. When a processor module 20 having a write-through cache requests a write operation, the data is written in both the cache 22 of the requesting processor module 20 and in the appropriate location in the main memory 40. By using a write-through cache, data consistency between the caches and main memory is maintained.

When a processor module 20 having a non-write through cache requests a write operation, the module acquires the data, and the data is written only into the cache 22. The bus tag store 32 is updated to indicate that the main memory location corresponding to the written cache location no longer contains valid data. Thereafter, any attempt to access that main memory location by a processor module 20, other than the module with the cache containing the valid data, will be directed to the cache with the valid data. Use of a non-write-through cache reduces traffic on the system bus 100 since there are less write operations issued by the processor modules.

Each CPU 21 transmits and receives vectors via the system bus 100 (which will be described below). Therefore, associated with each processor 21 is an interrupt FIFO queue 36 which stores received vectors until they are processed at which point they are dumped onto the IDB 23 during CPU interrupt acknowledge cycles. Vectors from the system bus 100 are not acknowledged or written into the FIFOs 36 if the FIFOs are full.

Figure 3:
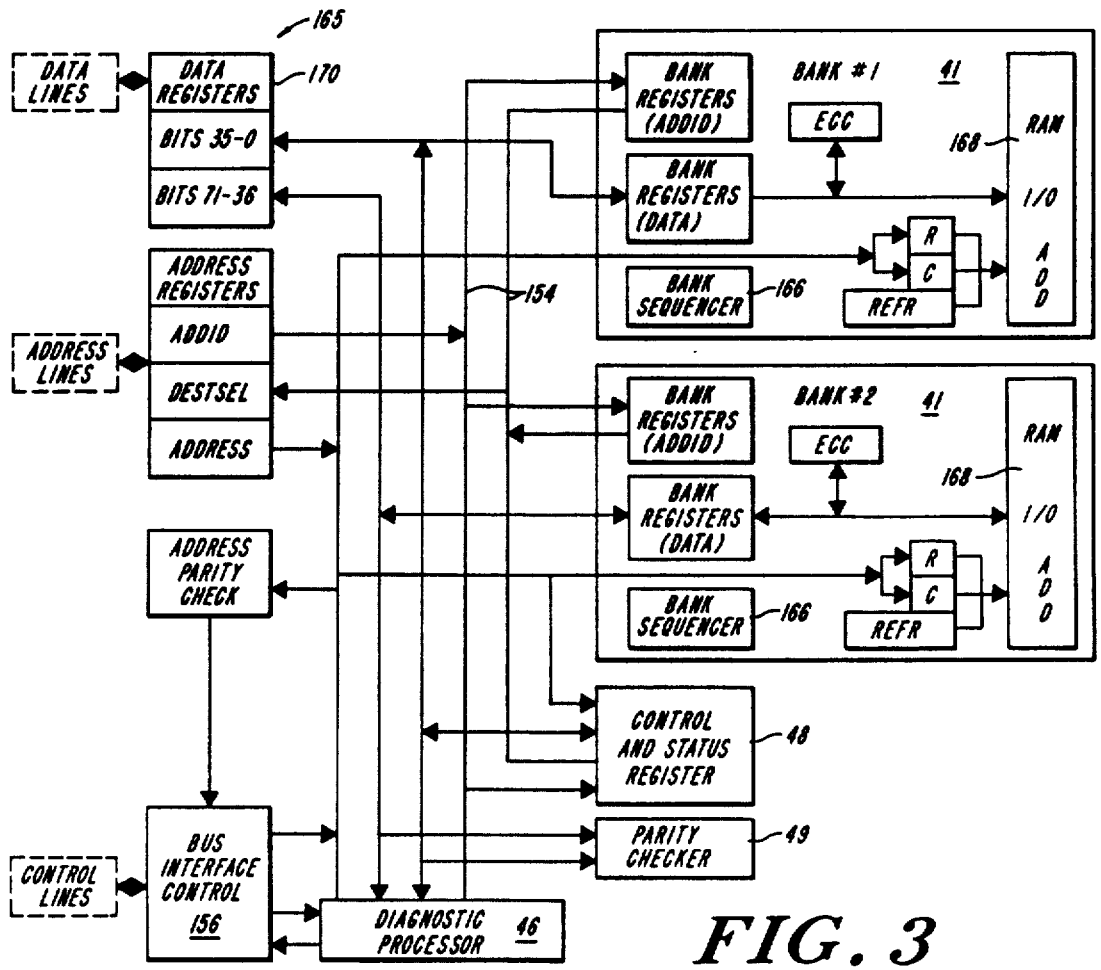
FIG. 3 is a block diagram of the various components of the memory module cf the multiprocessor system shown in FIG. 1.

As shown in FIG. 3 each shared memory module 40 preferrably includes two independent memory banks 41. The banks can include 256K MOS random access memory (RAM) chips, and the total storage capacity can be as high as 4 Mbytes. Each module supports four way interleaving between boards of equal memory size.

All data stored on the shared memory modules 40 is stored with an error correcting code (ECC). Single bit errors in each longword (32 bits) are ECC corrected with each access. Double-bit errors are detected and reported. In addition, the shared memory module 40 sweeps the entire memory array during refresh cycles and corrects any single-bit errors found. Since a complete refresh sweep occurs approximately every eight seconds (for 256K RAMS), the ECC sweep reduces the liklihood that a double-bit (uncorrectable) error will ever occur. Because of ECC, two memory chips on the shared memory module 40 could fail (one in each bank) without stopping system operations.

Each shared memory card 40 also carries a diagnostic microprocessor 46 which checks all memory banks at powerup and whenever directed to do so by the system diagnostic processor on the system control module 60. The shared memory card 40 maintains a control and status register 48 through which it reports single and double bit errors and bus parity errors to the requesting processor.

Figure 4:
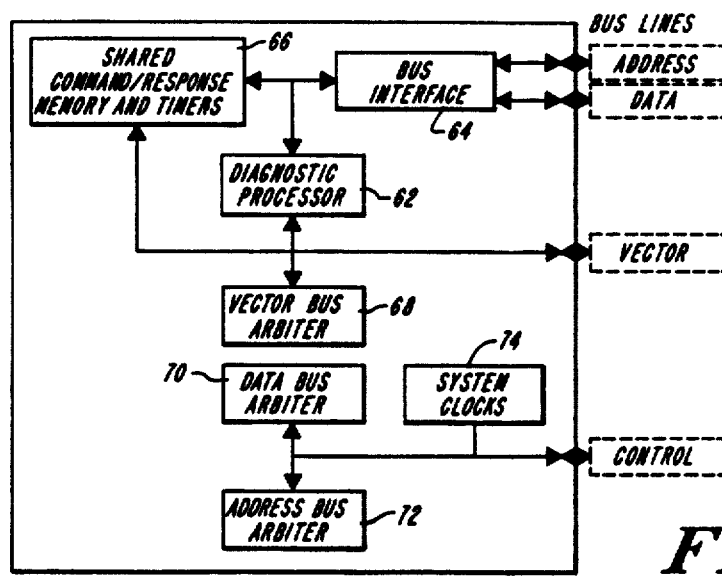
FIG. 4 is a block diagram showing the various components of the system control module of the multiprocessor system shown in FIG. 1.

The system control module (SCM) 60 functions as the communications clearing house, bus coordinator, and diagnostic center for the multiprocessor computer system 10 of the present invention. Various components of this system control module 60 are shown in outline form in FIG. 4.

The diagnostic processor 62 is based on an NS32016 microprocessor and has access to 128K bytes of onboard dynamic RAM as well as 4K bytes of battery backed-up static RAM. The diagnostic processor 62 performs system diagnostics and initialization after power-up, provides a time-of-year clock, and supervises the system control panel as well as the system console port and two local user ports. The diagnostic processor 62 also takes control of the system bus 100 and all associated modules when a fatal system error occurs. If the error is generated by a failed component on one of the system modules, the SCM 60 can deny that module access to the system bus 100 on the next restart. When restart occurs, the SCM can inform the operating system that the module should be treated as inactive.

The diagnostic processor 62 also includes the system bus interface 64 which permits the SCM's diagnositc processor 62 to access other modules connected to the systems bus 100, while simultaneously allowing other system modules to read and write the SCM Shared Command/Response Memory and Timers 66.

The Shared Memory and Timer facility 66 is visible to all active modules on the system bus 100. This facility does not, however, actively initiate requests. It contains timers that may be used for creating process identifications and timed interrupts. It also has 32K bytes of static RAM that is used to communicate commands and responses between the SCM 60 and other modules connected to the system bus 100.

As will be described below the system bus 100 is actually composed of several independent buses (address, data and vector buses) which may carry unrelated information in each bus cycle. As a result, it is necessary to arbitrate access to each bus separately. The vector bus arbiter 68, data bus arbiter 70, and address bus arbiter 72, which in the preferred embodiment are contained in the system control module 60, are provided for this purpose.

The system control module 60 also includes the system or master clock 74 for the multiprocessor computer system 10. This master clock is distributed from the system control module 60, and all bus clock lines on the system bus 100 are driven by this clock 74.

The Ethernet/Mass Storage (EMS) module 90 provides interfaces both to an Ethernet Local Area Network and to a Small Computer Systems Interface (SCSI) bus 91. In a preferred form of the multiprocessor system according to the present invention, the SCSI interface 98 on one EMS module supports SMD disks and a one-half inch tape drive. Additional EMS modules can be installed each of which can create a data pathway for additional SMD disk drives.

Figure 5:
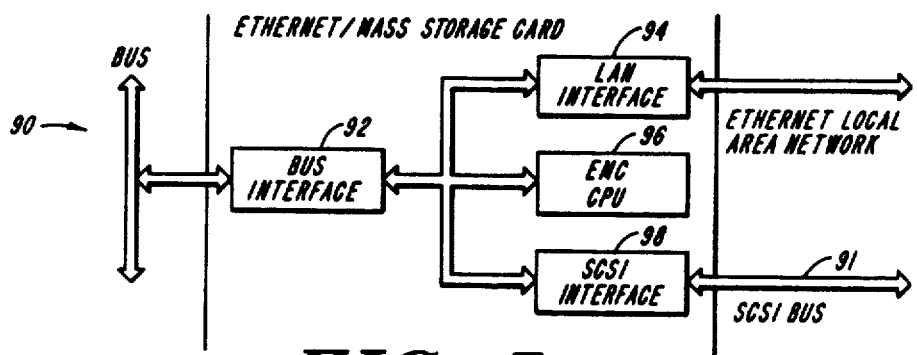
FIG. 5 is a block diagram showing the various components of the Ethernet/mass storage module of the multiprocessor computer system shown in FIG. 1.

As shown in FIG. 5, the Ethernet/Mass Storage Module 90 is made up of four basic elements: the system bus interface 92, a Local Area Network (LAN) interface 94, an Ethernet/Mass Storage CPU 96, and the SCSI interface 98. The system bus interface 92 is shared by each of the other three elements. The LAN interface 94 comprises an Ethernet controller, and a direct memory access (DMA) engine, and local memory. This memory is used for transmit/receive data, command and status information, network management statistics, and diagnostic information. Any portion of the LAN memory can be filled from or transferred to the multiprocessor's main memory by the LAN DMA engine.

The EMS CPU 96 preferably an NS32032 microprocessor equipped with local ROM for program storage, local RAM for program and data storage, local control/status registers, vector interrupts, and two windows into the multiprocessors system memory.

The SCSI interface 98 comprises an SCSI bus controller, a data FIFO, a microprocessor, and an SCSI DMA engine. The SCSI controller transfers data between the SCSI bus and the SCS data FIFO under control of the SCSI CPU. The SCSI DMA Engine can transfer data between the multiprocessor system main memory and the SCSI data FIFO in either direction.

A VMEbus adapter module 99 may also be provided for accepting a wide variety of the VMEbus cards. This adapter conforms to the well-documented VMEbus standards so that users of the multiprocessor system can implement new functions without the need to interface directly to the system bus 100. With the adapter 99 the system can accomodate real-time I/O interfaces as well as special-purpose user-designed interfaces.

Figure 6:
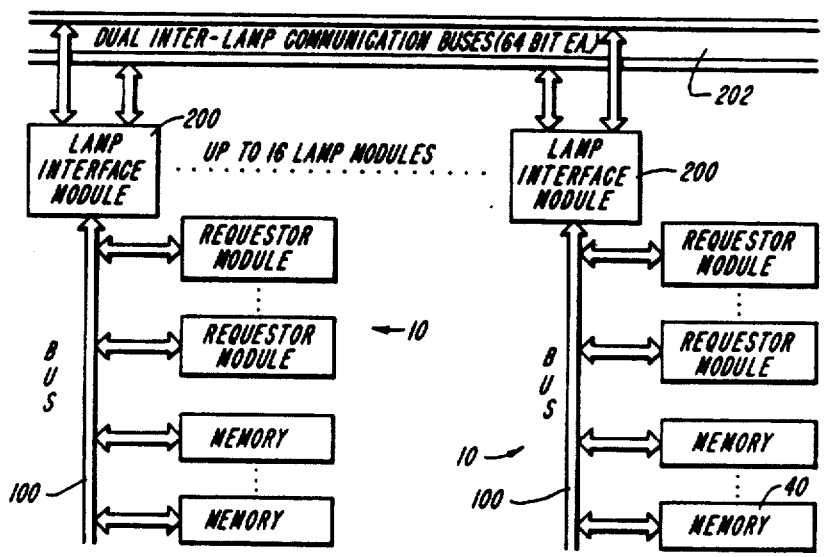
FIG. 6 is a block diagram of a computer system incorporating several multiprocessor computer systems of the type shown in FIG. 1.

Each multiprocessor computer system 10 can be further expanded through the large array multiprocessor (LAmP) interface module 200. As shown in FIG. 6, each system 10, which is represented by a series of requestor modules and shared memory modules is connected to other similar systems through the LAmP interface module 200 and a LAmP communication bus 202. As presently designed, a system incorporating such LAmP modules can accomodate up to 16 multiprocessor systems 10.

Figure 7:
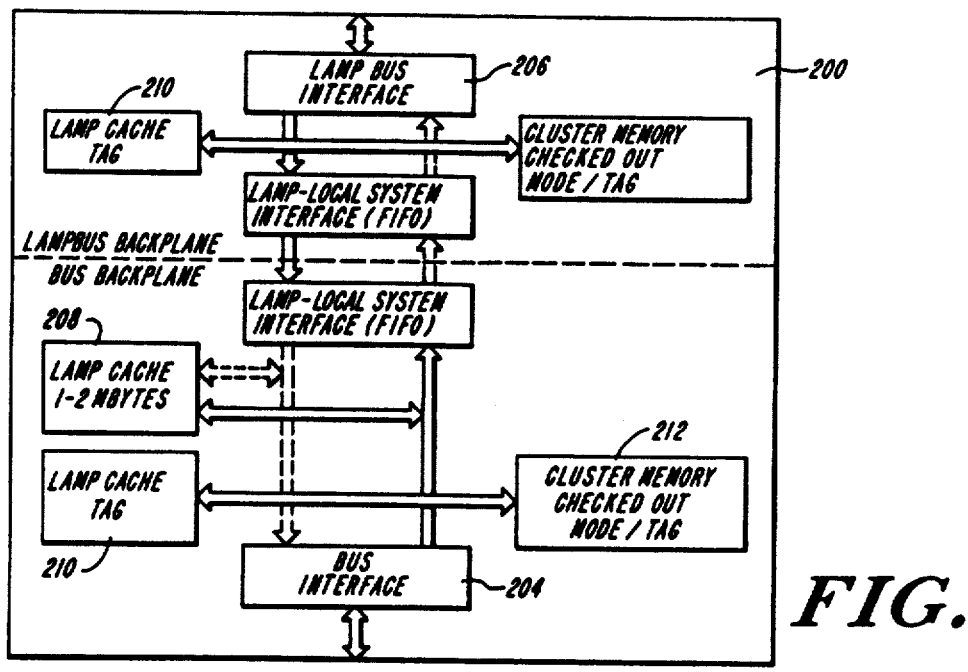
FIG. 7 is a block diagram of the components of the interface modules utilized to connect several multiprocessor systems as shown in FIG. 6.

As shown in FIG. 7, each LAmP interface module 200 includes a system bus interface 204 and a LAmP bus interface 206. The LAmP interface module 200 also includes a LAmP cache 208 which lowers access time to memories of a system other than the system to which the requester belongs. The LAmP cache therefore also reduces the number of requests sent across the LAmP communications bus 202 since the cache 208 handles requests for the most frequently accessed memory locations. A LAmP cache tag store 210 keeps an index of the main memory address of each cached location as well as the system number housing that main memory.

A LAmP cluster memory checked out tag 212 keeps an index of all memory locations residing in memory modules 40 in the multiprocessor system 10 which have been sent to other LAmP interconnected multiprocessor systems 10. System bus 100 requests which do not affect requester and responder modules connected to other LAmP interconnected system busses 100 are filtered out by the LAmP cluster memory checked out tag 212.

THE SYSTEM BUS

The system bus 100 is the primary system interconnect for connecting various modules of the multiprocessor computing system of the present invention. The bus 100 connects processors, memories, direct memory access peripherals, and slave peripherals.

The system bus 100 is a pended bus with a throughput of 100 megabytes per second. The bus comprises separate data 102 and address 104 buses which are independent in operation. The system bus 100 is a synchronous bus in which all transfers occur synchronously with the bus clock 108.

As shown in FIG. 1, the system bus 100 is comprised of four separate buses: the data bus 102, the address bus 104, the vector bus 106 and the control bus 108. As indicated in the drawing, the data bus 102 can pass 64 bits of information plus parity bits, and the address bus 104 will pass 32 bits of information plus parity bits. The advantage of using parallel data and address paths is that need for time-consuming multiplexing is eliminated. As a result, the bus bandwidth is greatly increased. Arbitration for the address bus 102 and the data bus 104 is only partially distributed. The decision as to which device has the highest priority currently requesting the bus is made by a central arbiter and passed to the elected bus requester. The decision as to whether or not a specific module should remove itself from the current set of allowable requesters, however, is made by each module. When a module has been granted the address bus, it asserts its address and, if necessary, data onto the bus. When a module has been granted the data bus, it asserts its data onto the data bus.

Before discussing the various arbitration schemes employed by the system bus 100, the various data transfer cycles will be described. As discussed above, transfers in the system of the present invention occur as pended transfers, i.e., the address of a read data transfer is sent to the recipient, and then the bus interleaves other operations while the return data is prepared. In other words, the bus does not wait for the data to return. Write addresses, however, will always be followed in the next cycle by the write data to be written.

There are various modules that can request the use of the address bus 104. These modules include the processor modules 20, the I/O module 90 and the LAmP interface module 200. A module wishing to use the address bus sends out a request which is sent over the control lines 108 to the system control module 60 which houses the arbiters. Once the address bus arbiter 72 grants access to the address bus 104, the grantee's address is placed on the address bus 104 during the next clock period. If the requested operation is a WRITE operation then the data to be written is placed on the data bus 102 during the clock period following the period during which the address is placed on the address bus 104.

There are also various modules that can request use of the data bus 102. A module wishing to use data bus 102 sends out a request sent over control lines 108 to the system control module 60 which houses the data bus arbiter 70. A module requesting access to the data bus 102 must also monitor the address bus 104 to determine if write data is about to be placed on data bus 102. In such cases the requesting module defers its request and re-requests the data bus at a later time.

An example of the timing and transfer cycles discussed above is shown in FIG. 8 where there are two control lines: one connected from the data bus arbiter, and the other from the address bus arbiter. As a request comes in from a requester module (Requester #1), the address bus arbiter 72 grants access to the address bus 104 to Requester #1 during one clock period. During the next clock period, the asserted address of Requester #1 is placed on the address bus. Since Request #1 is a READ operation, requester #1 must wait several bus clock periods for the data to be returned.

While Requester #1 places the desired address on the address bus 104, Requester #2 issues a request for a WRITE and was granted access to the address bus. The asserted address of Requester #2 is placed on the address lines during the very next clock period (period #3 in the example), and since a WRITE operation is requested the data is placed on the data bus 102 during the clock period following the period during which the address is placed on the address bus (period #4). During a WRITE operation, arbitration of access to the data bus 102 is not needed. Request #2 is thereby completed. A few clock periods later, the data for Request #1 is set to be returned. At this point, the data bus arbiter 70 must grant the module returning data access to the data bus 102. In this example access is granted immediately, and in the next clock period the data is placed on the data bus 102 and Request #1 is completed. If the data bus 102 had been busy, the module returning data would have had to wait until the bus was granted to it.

If for some reason, in the above example, a large number of WRITE requests were granted access to the buses, the read data would be locked out and thereby prevented from returning to the requester. To alleviate such a problem which will slow down processing, a special control signal UNJAM L is asserted on the bus to reserve the data bus 102 after a certain period of waiting for the data bus has elapsed (e.g. 4 bus cycles). When UNJAM is asserted, the address bus stops taking requests thereby freeing access to the data bus within a few clock periods. In addition, no new data bus requests will be posted. UNJAM is released once the waiting data has been granted access to the data bus.

The system bus 100, because it is a pended bus, will allow multiple requests to be pending to a single bank of memory. The memories do not have the ability to pipeline more than 2 requests (one in process and one pending) so it is possible that a memory bank 40 would be busy and unable to accept the address (and write data if a write cycle is requested). If this situation arises the memory bank will refuse the address and assert a RETRY signal which will cause the address to be retried four bus cycles later.

When any requester module detects that an address has been NAKed (e.g. as a result of a busy memory bank) it will not post any new requests until that NAK has been satisfied. This process ensures that no requester will be frozen out for an extended length of time because between his retries, other modules are posting and being granted requests through the location that he is also trying to access.

As discussed above, the address bus 104 and the data bus 102 each have an independent arbiter that monitors requests for data transfers. When a request is posted, the arbiter uses an algorithm that ensures fairness and allows access to a requester. The arbiter does so by passing a grant to the selected module. The selected module then asserts the address or data onto the bus. The address bus arbiter 72 ensures fairness in bus access by implementing the following algorithm:

1. All non-processor modules (e.g. the system control module or the bus adapters) may have priority over processor modules. These modules form priority group A. If any one of these devices is requesting the address bus 104, they will be granted access despite requests from a module of priority group B which is defined below.

2. Priority group B is comprised of all processor modules. A group B module will be granted an address transfer if it is the highest priority device in the group that is requesting a transfer, and there is no request from a group A device pending.

3. Whenever a device is granted access to the bus, the device logically following it becomes the highest priority.

The address bus arbiter 72 consists of a centralized arbitration mechanism and a distributed control mechanism. The centralized arbitration mechanism accepts requests and issues grants based on a rotating priority scheme using module slot numbers. In the preferred embodiment the central arbiter resides on the SCM 60. An example of the address bus arbitration scheme will be discussed with reference being made to FIG. 9a. The system shown in FIG. 9a contains eight requester modules. Assuming the bus was previously granted to module #1, then module #2 now has the highest priority. If modules #0 and #5 both request the bus then module #5 will be granted access since it is the next highest numbered module after module #2 requesting the bus. Following grant to module #5, the highest priority module will now be module #6.

The distributed control mechanism consists of a state sequencer on each module which determines if a module is allowed to post a request for the address bus 104. The address bus requests are modified by the requester modules if any of the following conditions exist:

1. When a priority group A module posts a request to the central address arbiter it may assert the signal PRIORITY L on the control bus 108 to force all priority group B modules to remove their requests, thereby giving higher priority access for group A modules.

2. All requesters will suspend write requests and read-modify-write requests as long as the signals STALL CYCLE L is asserted on the control bus 108.

3. If a memory module cannot gain access to the data bus to return requested data within a specified number of bus clock cycles, it asserts the UNJAM L signal on the control bus 108. Requesters will then suspend write requests until UNJAM L is no longer asserted.

4. When a memory bank to which a data transfer command is sent is busy, the memory will not assert the signal MEMORY ACCEPTED L on the control bus 108, thereby notifying the requester to retry the request again. Requester modules not requesting the bus at this time are not allowed to post a request until the retried module is serviced by the memory bank, thereby freezing the set of current requesters. The requests within the frozen set continue to arbitrate for the bus, with rotating priority, with the exception that the retried module is given the highest priority each time it posts its request. The retried module's request does not affect the rotating priority for the other requests in the frozen set. The requests are unfrozen when the retried modules is serviced by the memory bank.

Access to the data bus is allocated on the basis of the following algorithm:

1. If a write cycle is in progress on the address bus 104, the data bus 102 will always transfer the write data during the next data bus cycle regardless of other pending data bus requests.

2. If no write data transfers are pending, the highest priority device requesting the data bus for a read data transfer will be granted a data transfer. The logical priority order of devices which may request a data transfer is: the SCM, the bus adapter, the LAmP module, and the memory modules.

3. Priority on the data bus is strict numerical priority.

An example of the data bus arbitration scheme is set forth below with reference being made to FIG. 9b. In the embodiment of the system shown in FIG. 9b, the system includes a bus adapter, a LAmP module, an SCM, and three memory modules. In the example, the last module granted access was memory module No. 2.

If there are no write data transfers pending, and the LAmP module and memory module No. 3 request access to the data bus, access will be granted to the LAmP module due to the strict numerical priority of the data bus arbitration scheme. If instead of the LAmP module making the request, the request was made by memory module No. 1 and memory module No. 3, access would be granted to memory module No. 1 even though it may have had access to the data bus more recently than did memory module No. 3.

As discussed above, the multiprocessing computer system of the present invention incorporates the concept of a distributed cache. To ensure data consistency between the caches 22 and main memory 40, all caches 22 watch certain bus operations for hits in their bus tag stores (BTAG) 32. If a hit is found, the CPU logic will update its local CPU tag store 30. However, system requirements force the pipeline of such hits to be minimal, and therefore it is possible that multiple hits on the BTAG will fill the pipe. In such a case, the CPU must assert the STALL CYCLE L signal for the address bus arbiter to stall write and read-modify-write operations until the pipe is not full.

All data transferred on the system bus 100 is accompanied by a tag which exactly identifies the requester of the information so that the data can be returned. This information is contained on the address and data ID lines. The information that is passed consists of a 4 bit physical slot number and two reserved bits. These bits are generated by the requester, and are stored by the addressed device to be returned with the requested data. This information is used for two purposes: the physical slot number identifies to all modules of a local system to whom the data is to be returned. (By local, it is meant that the system is a single multiprocessor system connected to a single bus without including additional systems connected through a LAmP module.) The reserved bits are not used by any memory module, and they are simply returned to the requester unchanged. This allows the requester to tag the read data coming back from the memory to identify it uniquely. (e.g. A LAmP module might require these to identify which read data is being returned. A module with a plurality of processors might use these bits to identify the processor that posted the request.)

Read cycles on the system bus 100 are started through assertion of the ABUSREQ n signal. The address bus arbiter 74 will recognize the request, and when the priority is correct, will select the module. The address may be accepted by the addressee, or the addressee may indicate that it is busy and request that access be retried in 4 bus cycles. If the addressed location is nonexistent the system may reject the address. Also, if a LAmP board is present, the address may be accepted by the LAmP board and passed on to another local system.

Write cycles are also started through the assertion of ABUSREOn signal. The address bus arbiter 74 will recognize the request, and when the priority is correct, will select the appropriate module. The write data will always be transferred in the bus cycle immediately following the address, as will an indication as to which bytes of one of the longwords are to be written. As was the case during a read cycle, the address may be accepted by the addressee, or the addressee may indicate that it is busy, and request that access be retried in 4 bus cycles. Also, as in the case of a read cycle, the address may be rejected by the system because the addressed location is nonexistent. Unlike with read cycles, the write data will always follow the address regardless of whether or not the address is accepted. In addition, if a LAmP module is connected to the system, the address and write data may be accepted by the LAmP module and passed onto another local system.

In the present embodiment of the multiprocessor computer system of the present invention, the bus cycles are 80 nS long. This is sufficient time to transfer the necessary information regarding a bus cycle. There is insufficient time, however, for any module to act on the information within this bus cycle. Therefore, the system bus 100 is pipelined for one level. In other words, one cycle transfers data, and the second allows decision making on what to do with that data.

The process of transferring two longwords (64 bits) in one data cycle is referred to as a double-pump cycle. Such a cycle is requested by a requester when the address is transferred by asserting the request double pump line (REQDPMP L) of control bus 108. The address for a double-pump must reside on a double longword boundary, i.e., the last three bits of the address must be zero. A non-longword aligned double-pump request will produce unpredictable results. The data resulting from a double-pump read request will be returned together in the same data bus cycle on the 64 bit wide data bus. However, any addressed device may not grant the double-pump request—it may only grant a single transfer. This fact will be indicated to a read data requester when the data is returned to the requester. At that time, NDPMP L will be valid and will indicate to the requester whether the double-pump request is being satisfied, or whether only the low order longword is being returned. A requester who wishes to only perform a double-pump operation may assert the force double-pump line of control bus 108. An assertion of this signal will force a 64-bit transfer, and the subsequent returning of data with the NDPMP L signal not asserted.

The bus signals and the various functions they perform (some of which have already been described) are set forth below. For purposes of the following descriptions, the signals described are utilized in a configuration of the multiprocessor computer system 10 of the present invention of the type shown in FIG. 10. The requester modules can be either processor modules 20 or Ethernet/Mass Storage Modules 90. Also, when referring to parity generation, the following definition is intended: the parity bit generated always creates the parity that is described, i.e., an odd parity bit will be set when the number of ones in its protected field is even, thus creating odd parity, or an odd number of ones.

ADD 02–ADD 31: These lines carry the address of the location that is being addressed by the requester. Read operations are always performed on longwords, so bits zero and one are not needed. The BYTE n L and WORDSEL signals replace bits zero and one during write cycles. The address on these lines is asserted true, i.e., the bus is not inverted.

ADDP 0–ADDP 3: These are the parity bits for the address lines. The following parity algorithm is used:
 ADDP 0 is odd parity on CYCTYPE 0–1,ADD 02–07
 ADDP 1 is odd parity on ADD 08–15
 ADDP 2 is odd parity on ADD 16–23
 ADDP 3 is odd parity on ADD 24–31

DATA 00–DATA 63: These lines carry the data that is being transferred between devices on the bus 100 from all longword locations. DATA 00–DATA 31 carry 32 bits of data. The least significant bit is DATA 00 and the most significant bit is DATA 31. DATA 32–DATA 63 carry 32 bits of data from all odd longword locations. The least significant bit is DATA 32 and the most significant bit is DATA 63.

DATAP 0–7: These bits provide for parity on the data lines. DATAP 0 is the even parity bit for the byte on DATA 00–07, while DATAP 7 is the even parity bit for the byte located in DATA 56–63 Byte parity only has to be supplied for one longword if only one is being transferred. Therefore, a memory module must not check parity on a longword that is not being written.

ABUSREQ n L: This signal is asserted by requester n (n is between 0 and the number of available requesters, which in the preferred embodiment is 10) when it wants to request an address transfer. The ten requester slots assert ABUSREQ 0–9 L respectively. The Bus Adapter 99 asserts ABUSREQ 10 L. The SCM 60 does not need to assert a bus signal since it contains the bus arbiter. This signal must be asserted synchronously with the bus clock.

DBUSREQ n L: This signal is asserted by device n (n in the presently preferred embodiment is between 0 and 9) which wants to return data on the data bus. Memory modules 0–7 assert DBUSREO 0–7 L respectively. The Bus Adapter 99 asserts DBUSREO 8 L. The LAmP interface module 200 asserts DBUSREQ 9 L. The SCM 60 does not need to assert a bus signal since it contains the bus arbiter. This signal must be asserted synchronously with the bus clock. CYCTYPE 0–3: These signals are driven by the requester onto the system bus 100 along with the address, and they define the type of cycle that the address bus 104 is currently performing. The following CYCTYPE codes are used:

| CYCTYPE 0 1 2 3 | |
|---|---|
| 0 0 X X | indicates the read of an atomic read-modify-write cycle |
| 0 1 0 1 | indicates a read private access cycle |
| 0 1 X 0 | reserved for future allocation |
| 0 1 1 1 | indicates a read public access cycle |
| 1 0 1 1 | indicates a write invalidate cycle |
| 1 0 0 1 | write modified cycle |
| 1 0 1 0 | write response cycle |
| 1 0 0 0 | reserved for future allocation |
| 1 1 X X | indicates that there is currently not a valid address on the bus |

X = do not care

Note that it is the responsibility of any device that can return data on the bus 100 to monitor the CYCTYPE lines for indication that a write address is being transferred on the address bus. If this event occurs, during the next data bus slot the requester will drive the write data. Therefore, any device planning to return data during the time slot following a write address transfer must defer one additional data bus cycle.

BYTE n L: These signals are asserted during all bus cycles (reads and writes) to indicate which of the bytes are valid.

BYTE 0-3L apply to byte 0 through 3 respectively of the longword that is selected by WORDSEL.

WORDSEL H: This signal determines which longword BYTE n L is to be applied to. If negated, this signal indicates that the selected longword is the longword on DATA 00-31. If WORDSEL is asserted, the longword on DATA 32-63 is selected.

BYTEP: This signal represents odd parity on BYTE n L, WORDSEL, FDPMP L, REQDPMP L and CYCTYPE 2.

NOCACHE L: This signal is asserted by all devices returning read data which should not be cached. Such data would be from any location that can be manipulated without visible bus activity for BTAG monitoring. Examples of such locations are dual ported memories, registers on any module, or locations that are really on another bus and seen only through a bus adapter.

PRIORITY L: This signal is asserted by a requester that is not a Class B device, i.e., any requester except a CPU. This allows these requesters, such as EMS modules, the SCM 60 and the bus adapter 99, to quickly access the bus 100.

MEMORY ACCEPTED L: This signal is asserted by a memory device to indicate that it has successfully decoded the address on ADD 02-ADD 31 and that the request for data transfer has been accepted.

MEMORY BYPASS L: This signal is asserted by a non-write through cache which wants to respond to the current address on the address bus 104. This signal, when asserted, overrides the MEMORY ACCEPTED L signal. The memory will abort any transfer it had planned as a response to this address.

CACHE ACCEPTED L: This signal is asserted only if MEMORY BYPASS L is asserted. When asserted, it indicates that a non-write through cache has accepted the address.

WRITE DATA PARITY L: This signal is asserted one bus cycle after MEMORY ACCEPTED L would be valid (for a write data transfer). The signal indicates whether or not the write data was successfully transferred.

REQDPMP L: This signal is asserted by the requester to indicate that the requested bus cycle is a double-pump request. Note that the address of all double-pump requests must be double longword aligned or the results will be unpredictable.

DPMP L: This signal may be asserted by the target of a double pump request. It will be asserted if the double pump request that has been requested is being serviced as a double-pump request.

FORCE DPMP REQ L: This signal is asserted by the requester to force the addressed memory module to service the request as a double pump. If a bank on the memory module is busy, the request will be retried.

STALL CYCLE L: This signal can be asserted by any requester at any time due to BTAG FIFO overflow or a detected bus address parity error. When asserted, the memory module must abort the received request that caused the stall condition and requesters must suspend write and read-modify-write requests.

UNJAM L: This signal is asserted if a memory has been unable to gain access to data bus 102 in a specified number of bus cycles. When asserted, this signal
 prevents new requests for the data bus 102 from being posted;
 suspends granting of the address bus 104 by the address bus arbiter 72 of the system control module 60.

ADDID 0-5: These signals are asserted, along with the address, by the selected requester. They indicate to the addressed module which requester module is performing the transfer. The ADDID consists of two fields: the physical slot number field and two reserved bits. The following scheme is used to define the physical slot field, ADDID 0-3:

| 0xxx-1001 | Requester module 0-9 as identified by slot number |
|---|---|
| 1100 | System Control Module |
| 1101 | Bus Adapter |

ADDID 4 and 5 are reserved for use by the requester. The memory will return these bits along with the requested data, and these bits will be unmodified. This allows requesters to tag the data that they will have returned with any two bits of information.

ADDIDP: This bit creates even parity on ADDID 0-5.

DESTSEL 0-5: These signals are asserted by a device that is asserting previously requested read data on the data bus. They are simply a copy of ADDID 0-5 as was used during the transfer of the address to this device. They indicate which requester is having its requested data returned on the bus, and consists of two fields: the physical slot number field and two reserved bits. The following scheme is used to define the physical slot field, DESTSEL 0-3:

| 0xxx-1001 | Requester module 0-9 as identified by slot number |
|---|---|
| 1100 | System Control Module |
| 1101 | Bus Adapter |
| 1111 | No valid read data on bus (valid write data may be on the bus) |

DESTSEL 4 and 5 are reserved for use by the requester. The memory will return these bits along with the requested data, and these bits will be unmodified. This allows requesters to tag the data that they will have returned with any two bits of information. If the data being transferred is write data, the requester drives the DESTSEL lines to ones if the cache of the requester is a write-through cache. If a requester requests data stored in a non-write-through cache, DESTSEL contains the ADDID of the requester of the data. The terminated state of all ones will indicate to all other modules that this is write data and it should be ignored by all requester modules.

DESTSELP: This signal provides odd parity on DESTSEL L bits 0-5, DPMP L, and NOCACHE L.

SLOTID 0-3: These four signals are encoded uniquely in each slot on the bus 100. This allows a module to read these lines and determine in which slot it is located.

BCLOCK n L: This signal provides the basic bus timing. In the preferred embodiment the clock pulse can be as short as 80 mSec with a high time between 22 mSec and 33 mSec. The BCLOCK n L is distributed on 6 lines that are connected as follows:

| | |
|---|---|
| BCLOCK 1 L | Memory Module 0-2 |
| BCLOCK 2 L | Memory Module 3-5 |
| BCLOCK 3 L | Memory Module 6, 7, Requester slot 0, SCM |
| BCLOCK 4 L | Requester slot 1-4 |
| BCLOCK 5 L | Requester slot 5-7 |
| BCLOCK 6 L | Requester slot 8, 9, bus adapter |

Note that all lines drive three modules, except for BCLOCK 3 and 4. In the present configuration, these two drives shorter backplane runs, so they have an additional module load.

DCOK H: This signal is de-asserted by the SCM 60 and the power supply to reset all hardware in the system except its own. All system state is lost when DCOK H is de-asserted. This would usually be done following power-up, after a non-recoverable system fault, or as the DC power is going out of tolerence.

POWERFAIL L: This signal is asserted by the power supply. It indicates that the AC power is failing and there remains at least 3 mS of good DC power before DCOK H will be de-asserted. The following matrix defines the possible combinations of POWERFAIL L and DCOK H:

| DCOK H | POWERFAIL L | INDICATION |
|---|---|---|
| Asserted | Asserted | Power failing |
| Asserted | Not-asserted | Normal operations |
| Not-asserted | Asserted | Power-up reset |
| Not-asserted | Not-asserted | Software Reset |

SCMNMI L: This signal is asserted by any module in the system which wants to cause a non-maskable interrupt to the diagnostic processor on the SCM 60. When it is asserted, all modules freeze their bus interfaces and cause local non-maskable interrupts. This signal is synchronous to the system BCLOCK. It must be asserted by any module on the leading edge of ENDATA and must be held for at least on major cycle. All modules sample SCMNMI L on the leading edge of CKDATA UNFREEZE n L: This signal is asserted by the SCM diagnostic processor 62 to unfreeze the bus interface of one requester module. Although the assertion of this signal enables the bus interface of the selected module, it leaves the data cache, bus parity check, and lock logic disabled. This logic will be re-enabled when the SCM 60 deasserts the UNFREEZE L signal. This event may be monitored by a requester module by having the UNFREEZE L line readable in a local CSR. There are 11 UNFREEZE L signal lines, one for each requester except for the SCM itself.

TESTRACK L: This signal is not connected in the multiprocessor system. Each module is required to have a pull-up resistor on this line. When the module is placed in the burn-in test rack, the connector that it is plugged into will ground this pin. This will allow the module to determine in which mode it should run its self test.

ADDSEL n L: These signals (n is between 0 and 10) are asserted by the address bus arbiter to select the next module that will be selected to assert its address onto the address bus. Note that the SCM 60 does not have a grant line since it contains the arbiter. These signals are not encoded—there is one grant line per requester.

DATASEL n L: One of these signals is asserted by the data bus arbiter to select the next module that will be selected to assert its data onto the data bus. Each of the DATASEL L lines is connected to one module. DATASEL 0-7 are connected to memory module 0 through 7 respectively. DATASEL 8 L is connected to the Bus Adapter 99, and DATASEL 9 is connected to the LAmP module 200.

In addition to the data bus 102 and the address bus 104, the system bus 100 includes a vector bus 106. This vector bus is responsible for transferring vectored interrupts among modules of each local system 10. All bus requesters can cause interrupts to other requesters, and therefore all requesters must have access to the vector bus 106. The vector bus 106 not only allows transfer of vectors among the requesters, but it also supports arbitration among the requesters for class interrupts. When a requester desires to transfer an interrupt, it is transferred to a class of devices. A directed interrupt designation allows the specification of a particular requester. In this case, the vector transfer is straight forward, i.e., the vector goes straight to the particular requester. If, however, a class interrupt is specified, all requesters within that particular class must arbitrate between themselves and only the lowest priority requester can accept the interrupt. This latter function is performed through a parallel arbitration scheme which will be described below.

The vector bus 106 also allows the transfer of vectors through the LAmP interface module 200 to other systems 10. This may be done by targeting an entire class in another system, or by specifying a unique requester in another system.

The vector bus 106 is a bus which contains twelve open collector signal lines and two TTL signal lines. Ten of the open collector signal lines are used as vector data lines, one open collector signal line is used as a LAmP select/bus adapter request line, and the other open collector signal line is used as an acknowledge line. The two TTL signal lines are vector bus phase lines. Control of the vector bus is provided by an arbiter controller which is positioned on the system control module 60. This controller also determines which phase the bus is in.

Figures 10, 11:
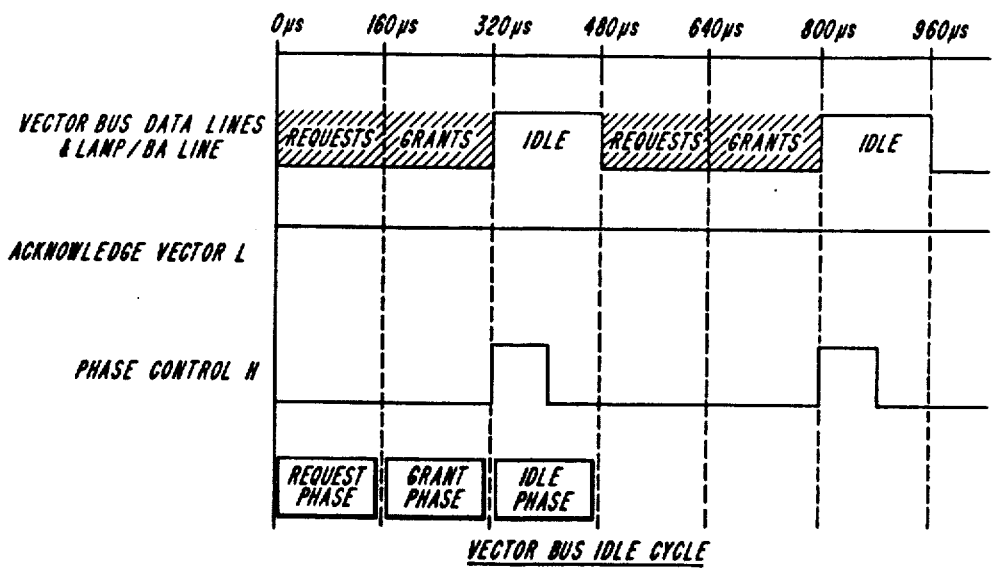
FIG. 10 is a diagrammatic view of a bus backplane of a preferred embodiment of the multiprocessor computer system shown in FIG. 1.
FIG. 11 is a timing diagram for an idle cycle of the bus of the multiprocessor computer system shown in FIG. 1.

The bus 106 runs through three types of timing cycles: an idle cycle, directed vector cycle, and a class vector cycle. When the vector bus 106 is idle (i.e. no requesters requesting the bus), the following operations are repeatedly performed until a requester posts a request during the request phase (as shown in FIG. 11):

| 1. Request the bus | 1 bus cycle |
| 2. Grant the bus | 1 bus cycle |
| 3. Idle | 1 bus cycle |

Figure 12A:
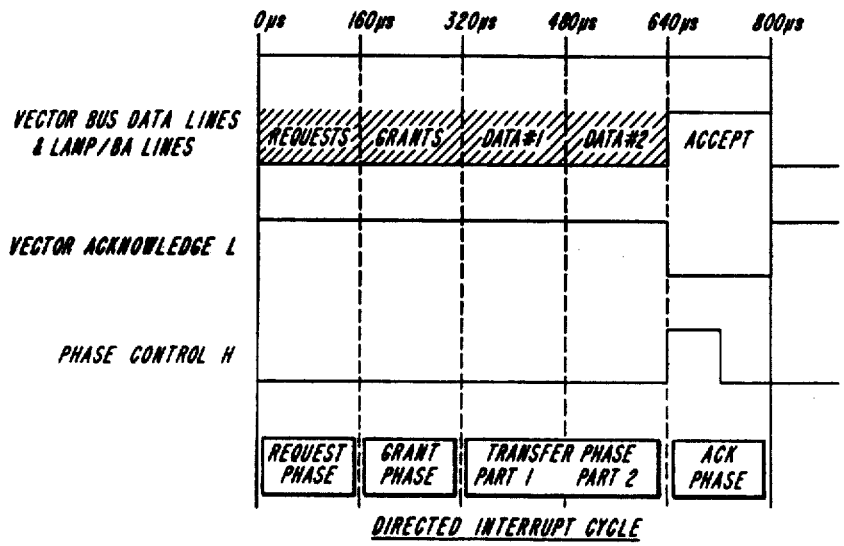
FIG. 12a is a timing diagram for a directed interrupt vector transmitted by a module of the multiprocessor computer system shown in FIG. 1.

When performing a directed interrupt vector transfer, the following operations are performed (as shown in FIG. 12a):

| 1. Request | 1 bus cycle |
| 2. Grant the bus | 1 bus cycle |
| 3. Transfer the vector | 2 bus cycles |
| 4. Acknowledge the Receipt of the vector | 1 bus cycle |

Figure 12B:
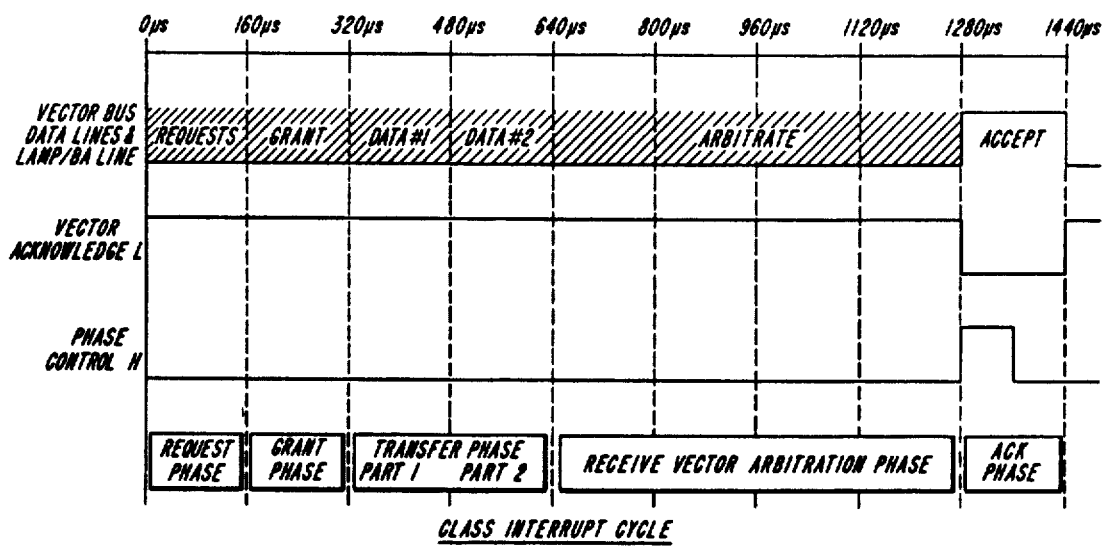
FIG. 12b is a timing diagram for a class interrupt vector transmitted by a module of the multiprocessor computer system shown in FIG. 1.

If the vector transfer involves a class interrupt vector, the following operations are performed (as shown in FIG. 12b):

| 1. Request the bus | 1 bus cycle |
| 2. Grant the bus | 1 bus cycle |
| 3. Transfer the vector | 2 bus cycles |
| 4. Arbitrate for the processor who is to accept the vector | 4 bus cycles (Maximum) |
| 5. Acknowledge receipt of the vector | 1 bus cycle |

All transfers through the LAmP interface module 200 to another system 10 other than the one in which the requester is located, regardless of type, go through a vector bus cycle as if they were directed transfers. This is because a transfer only occurs from the requester to the LAmP module 200, and the LAmP module 200 performs the correct vector bus cycle in the target local system 10. A non-local system transfer is identified by the assertion of the LAmP select signal during two of the vector bus transfers. One vector bus cycle is equivalent to two system bus cycles.

Ten requesters may assert request lines to arbitrate for the vector bus. The bus adapter 99 also may assert a request line for the LAmP select/bus adapter request line. Since the system control module 60 contains the vector bus arbiter, it does not need to assert a bus signal line to request the vector bus. The grants to the modules occur on the same line that they were requested on.

Figure 13:
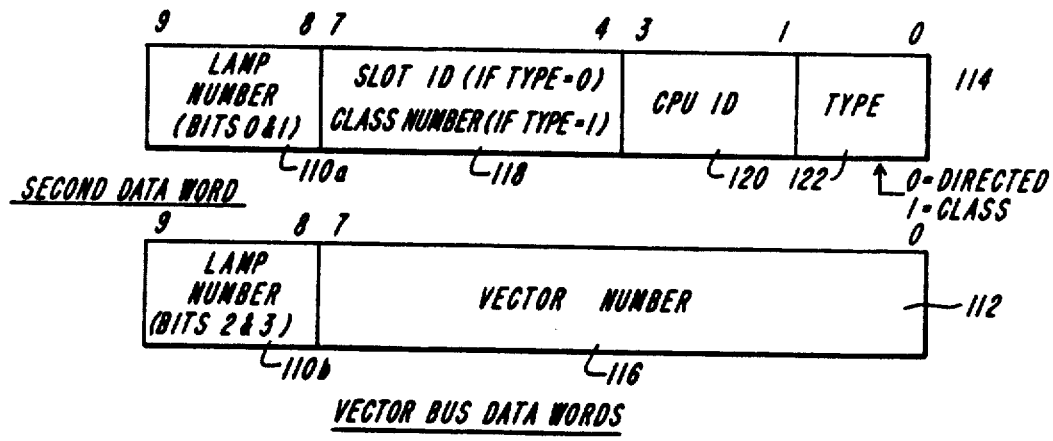
FIG. 13 is a diagrammatic representation of the data words sent with a vector transmitted by a module of the multiprocessor computer system shown in FIG. 1.

During a vector data transfer cycle, a number of pieces of information are transferred across the vector bus on vector data lines 0-9 by the requester that was granted the bus. This information is contained in two data words as shown in FIG. 13. The LAmP identification number 110 which is used when the vector is sent from or received by a local system other than the system being serviced by the bus 100 carrying the vector is a four bit number. Two of these bits 110a are included on the first data word 114 and the second two of these bits 110b are included on the second data word 112. In addition to including the first two bits 110a of the LAmP identification number, the first data word 114 includes a TYPE identification number 122 which indicates how the SLOT ID/CLASS bits 118 are to be interpreted. When the TYPE identified number 122 is 0, i.e. a directed transfer, the SLOT ID/CLASS bits 118 contain a number that indicates the slot on the backplane which contains the module that is to receive the vector. When the TYPE is 1, the SLOT ID/Class bits contain the class number of the vector. The first data word 114 also includes a three bit CPU identification number 120 which will identify a processor of a module in the selected slot. In addition to the second two bits 110a of the LAmP identification number, the second data word also includes a vector identification number 116.

After the data transfer phase has taken place, one of two sets of events occurs depending on the type of vector that has been transferred. If a directed vector or a non-local system vector of any type has been transferred, the addressed module simply transfers the previously received vector to its local processor and asserts the Vector Taken signal. If it was a class vector and the LAmP select signal was not asserted during the vector data transfer, the requester modules must arbitrate for the vector. The intent of the arbitration scheme is to allow all modules in the same class as the transferred vector to determine who among themselves has the lowest priority.

Figure 14:
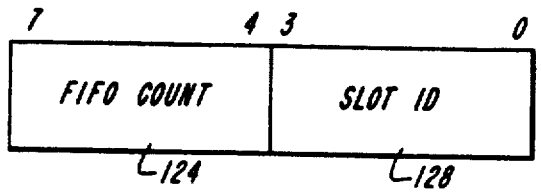
FIG. 14 is a diagrammatic representation of the ten data lines utilized in the vector bus arbitration scheme of the multiprocessor computer system shown in FIG. 1.

A module's priority is determined by the following information which is asserted onto the 8 vector data lines which are shown in the diagram of FIG. 14. The silo depth or FIFO count bits 124 indicate that a vector or vectors has been queued to the processor. The silo depth bits allow for equal distribution of vectors among requestors within a class. The slot identification number 128 indicates in which slot the module is located. The arbitration scheme is a parallel arbitration method, whereby a module asserts all of the above information on the open collector bus, and compares the information actually received from the bus with the information it is asserting. This comparison is started with the highest order bit and worked down to the lowest order bit. When a mismatch is found between what is being asserted and what is on the bus, the module disables driving all bits of lower significance. Since a module slot number is included in the arbitration information, it, is guaranteed that only one module will ever win arbitration even if two modules have the same priority and in service bit setting. This comparison and deselection process is done asynchronously, and therefore the 4 bus cycles alloted for the vector receive arbitration is the maximum time required to allow the arbitration lines to settle.

The system bus 100 transfers address and data information during one major cycle of the bus. Data transfers by the bus 100 require a timing pulse and a clock edge. The timing pulse is used to disable the current bus drivers, select a new bus driver, and re-enable the new bus driver. The clock edge is used to clock in the data at all remaining modules in the system.

Figure 15:
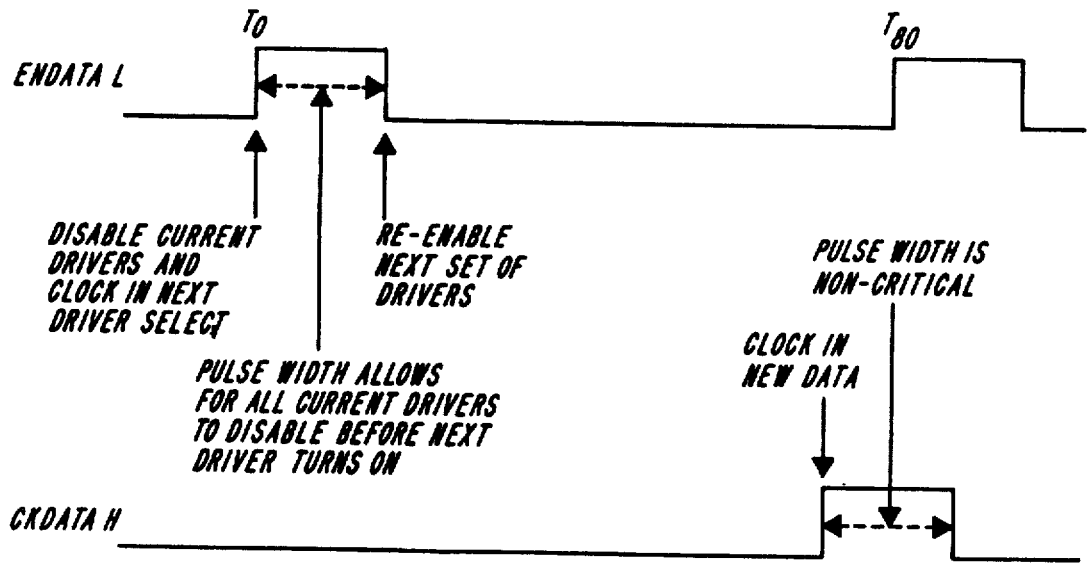
FIG. 15–16 are timing diagrams showing various examples for the bus of the multiprocessor computer systems shown in FIG. 1.

The accuracy of the distribution of these timing signals are crucial to the performance of the bus 100. It is not feasible to distribute these edges with the required accuracy due to capacitive delay in the bus, skew between gates on different modules, threshold variances across gates, etc. Therefore, the scheme that is used for the bus 100 of the present invention is to carefully distribute only one timing edge across the system. This edge is used to trigger a delay line/pulse generator which allows for closely controlled pulse generation. The diagram shown in FIG. 15 illustrates the theory of the timing pulse and the timing edge that are generated by the delay line. ENDATA L is the signal that generates the bus driver disable pulse 132 which also clocks in the next driver select. The pulse 132 must have a pulse width large enough to allow all current drivers to disable before the next driver turns on. The falling edge of the pulse 132 re-enables the next set of drivers. It is qualified on each module to create the EN BUF TO BUS L signal. CKDATA H is used as the data clock.

Figure 16:
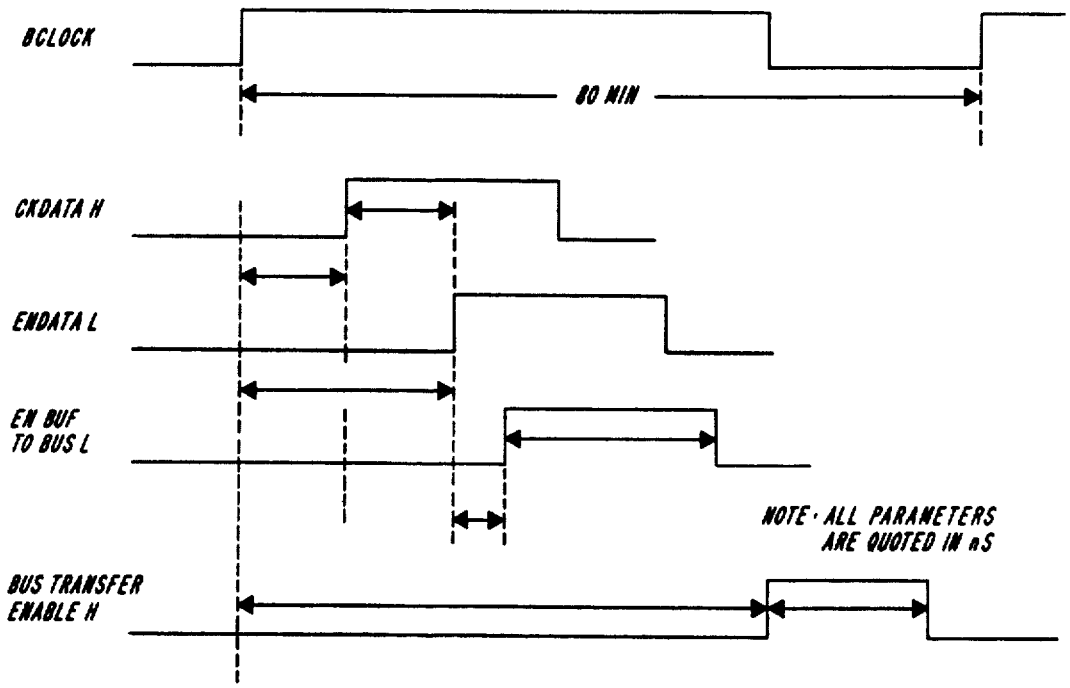

The timing analysis of the bus of the present invention shown in FIG. 16 results from the use of a delay line as well as an electrical analysis of the worst case bus skew and threshhold variations. Note that in reading the timing analysis diagram, the CKDATA H signal is applicable to the previous cycle relative to the EN-DATA L signal. In addition, two pulses labeled BUS TRANSFER ENABLE 1H and TRANSFER ENABLE 2H are included. These pulses are required to allow modules to reliably transfer data internally that has been received from the system bus 100.

Figure 17:
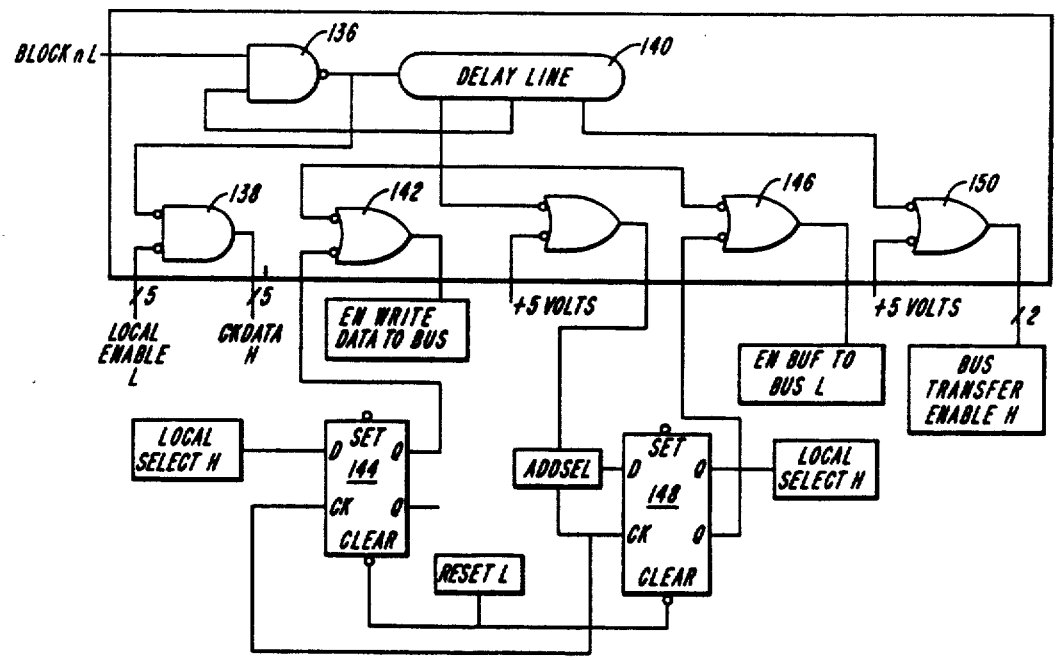
FIG. 17 is a schematic view of the circuitry required for creating the delay signals shown in the timing diagram of FIG. 16.
Figure 18:
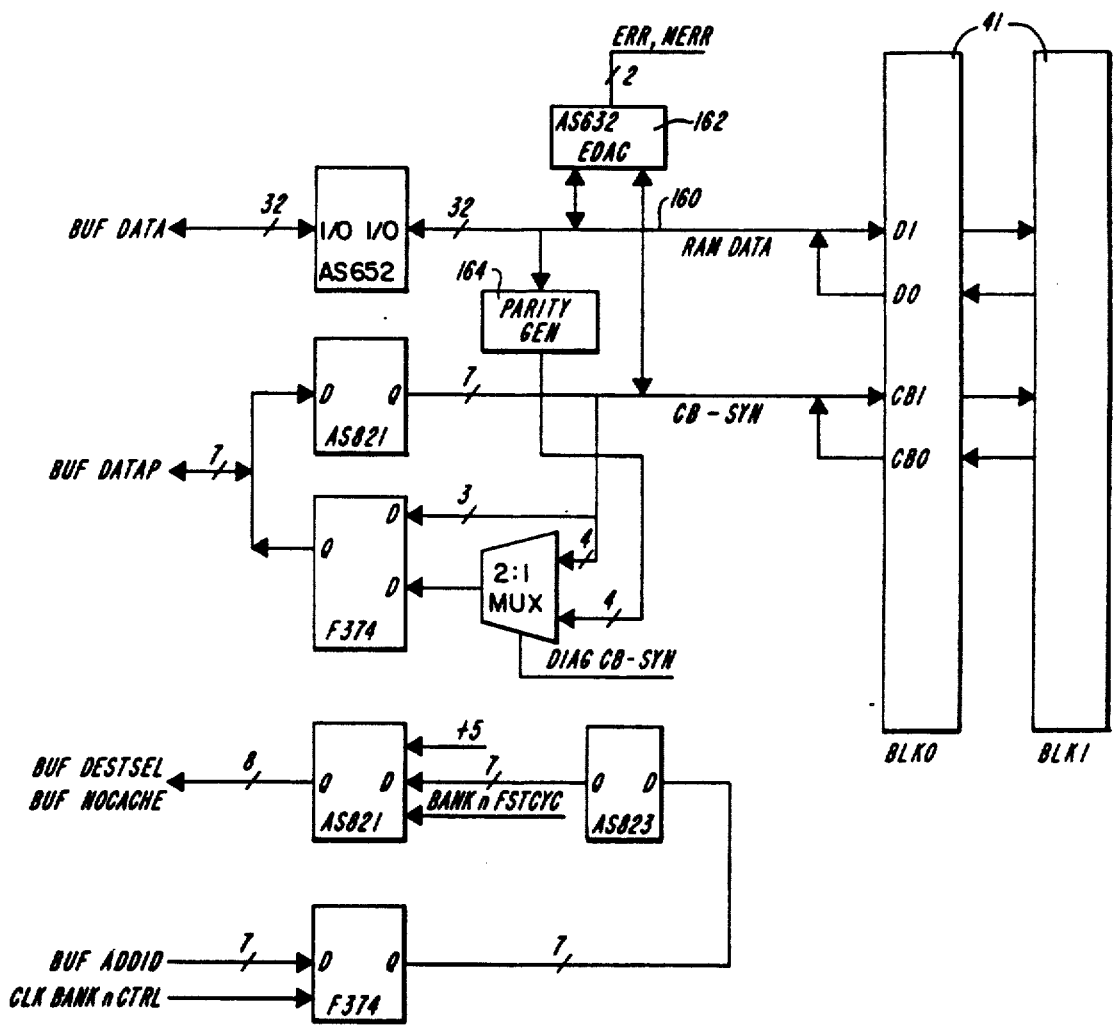
FIG. 18 is a schematic view of the circuitry utilized on the memory module of the multiprocessor computer system shown in FIG. 1.

The circuitry for creating the delayed pulses shown in FIGS. 15 and 16 is shown in FIG. 17. The delay circuitry is clocked by the bus clock BCLOCK n L which is applied to the delay line through NAND gate 136 the other input of which is fed from the delay line 140. The output from NAND gate 136 is fed to the delay line 140 and to the input of NOR gates 138. The other inputs of the NOR gates 138 are fed from Local Enable L. The output of the five NOR gates 138 provides the CKDATA H signals. Another output from delay line 140 is fed to NAND 142. The other input to NAND 142 is provided by D-type flip flop 144, the data line (D input) of which is connected to Local Select H. NAND 142 provides the Enable Write Data to Bus signal. Further output of the delay line 140 is fed to NAND 146, the other input of which is provided by D flip flop 148 which receives its data signal from ADDSEL. The NAND gate 146 provides the EN BUF TO BUS L signal. The final output from delay line 140 is fed to NAND gates 150 whose other inputs are connected to a five volt voltage source. NAND gates 150 provide the BUS TRANSFER ENABLE 1H and BUS TRANSFER ENABLE 2H signals.

SYSTEM MEMORY

The system memory of the multiprocessor computer system of the present invention comprises two independent memory banks 41, a control and status register (CSR) 48 and an onboard diagnostic processor 46 for self testing. The addressing structure supports four-way interleaving between memory modules 40 of equivalent size. Module interleaving is controlled by CSR bits 12 and 13 and is automatic between banks. The memory bus interface is an integral part of the system bus 100, and as such can be considered an extension of the bus. The internal bus 154 of the system memory 40, BUF DATA, operates at twice the data rate of the bus 100. Read data is transferred from a memory bank 41 or the CSR 48 to the bus interface buffers when ENDATA is negated, and write data from the bus interface is transferred when CLKDATA is negated. This architecture allows the memory system to transfer both read and write data between the bus interface 165 and memory banks (or CSR) within a single bus major cycle.

As shown in the simplified block diagram of the memory system of FIG. 3, the memory banks 41 and the CSR 48 are separate subsystems interfacing to an internal bus 154. The internal bus 154 is driven by the bus interface control 156 or the on-board diagnostic processor 46. When the diagnostic processor 46 is connected to the internal bus 154, the memory becomes invisible to the bus interface control 156. Hence the system diagnostic processor 46 must implement a time out mechanism whenever self test is initiated by writing to CSR bit 15. Since the CSR 48 is not available in this mode, the data bus request logic implements a priority mechanism whereby data transfers on the internal bus 154 are synchronized to the data availability of the individual banks. Address parity from the bus interface control 156 is checked at the receivers and if in error, the address will be treated as nonexistent. Write data parity is checked in the write data parity checking logic 49. If error is found, the write will be aborted and WRITE DATA PARITY ERROR L will be asserted. Read data parity is generated locally at each subsystem. Parity on the ADDID field is not checked; ADDIDP is merely copied to DESTSELP for CSR references or complemented to DESTSELP for memory references. This is required because DESTSELP includes parity on NOCACHE.

As shown in FIG. 11, each memory bank 41 comprises two rows of RAMs connected to a single bidirectional data bus 160. Interfacing to this internal bus is an error detecting and correcting chip (EDAC) 162 along with parity logic 164 for generating and checking parity for the system bus 100. There are no error correcting code bits on the bus 100. Read data parity is generated in the parity logic 164 and transmitted to the bus interface 165 via BUF DATA. Write data parity is checked by logic 49, and on errors WRITE DATA PARITY ERROR L is asserted and the write cycle is turned into a refresh. The CSR 48 will be updated with the ADDID of the transfer. The diagnostic processor 46 uses DATAP lines to transfer check bits and/or syndromes between the memory banks and its data interface.

Each memory bank 120 is sequenced by separate controllers 166 which operate independently. In the presently preferred embodiment, the controllers are implemented in 82S105A state sequencers. Two devices are operated in parallel per bank in order to generate sufficient control outputs. Seven basic cycle types are defined for each controller as follows:

| Cycle | Description |
| --- | --- |
| 0 | Refresh |
| 1 | Bus interface read only |
| 2 | Bus interface read interlock |
| 3 | Bus interface longword write |
| 4 | Bus interface write |
| 5 | Diagnostic diabled correct read |
| 6 | Diagnostic disable correct write |

When a cycle 0 (Refresh) is activated, a bank 41 is selected when the refresh timer requests a refresh. A refresh cycle always takes priority over any pending request from either the bus interface 165 or the diagnostic processor 48. If ECC initialize is enabled, the controller will latch the output register of the error detecting and correcting chip (EDAC) 162 and force a check bit generating mode. Thus, during ECC initialize the random contents of the EDAC chip output register are written to memory along with correct check bits. The RAM timer is then triggered thus writing the RAMs 168. If ECC initialize is not in effect, the contents of the refreshed address are read and latched in the EDAC chip 162. If error sweep is enabled, the data will be checked for errors. Single bit errors will be corrected and written back to memory. Multiple bit errors are ignored.

A cycle 1 (read only) is initiated when the corresponding bank 41 has its address latch loaded and there is no pending refresh cycle. If the bank is not currently busy, the RAM timer is triggered by the address load logic in parallel with starting the bank sequencer 166. If the bank 41 is currently busy the RAM timer is triggered by the sequencer 166 on a busy to not-busy state transition. During a read only cycle the selected row of RAMs are accessed and the read data loaded in both the EDAC chip 162 and the bank-to-buf data registers 170. The controller 166 also makes a request to transfer the read data across the bus interface 165 in parallel with checking the data for errors. If there are no errors, the previously loaded RAM data will be transferred to the bus interface 165. Otherwise, the data slot, if granted, will be wasted and corrected data (if single bit error) will be reloaded into the bank-to-buf registers from the EDAC chip 162. Uncorrectable data errors are logged with the CSR 48.

A cycle 2 (read interlock) cycle is basically a read followed by an automatic write to the same memory location. In other words, this operation is an internal read-modify-write cycle at the bank level. During this cycle, a memory bank 41 performs a read operation which is identical to that of the cycle 1 read only discussed above and sends the data to the requester. During the write phase, the bank controller 166 causes all ones to be written in the byte location which has just been read. The advantage of such a read-modify-write cycle being performed by the memory module 40 is that atomic bit set operations can be performed without tying up the bus and preventing further access to the bus.

In a cycle 3 (longword write) operation, longword writes are accomplished by writing 32 bits of data from the buf-to-bank registers 170 to memory along with correct check bits.

A cycle 4 (write byte) cycle is similar to the read interlock cycle (cycle 2) in that both operations perform an internal read-modify-write operation. The accessed location is read from RAMs latched in the EDAC chip 162 and checked for errors. Single bit errors, if any, are automatically corrected. Uncorrectable errors are again flagged and logged in the CSR 48. In the case of an uncorrectable error the write operation will be aborted and the cycle terminated. If there are no uncorrectable errors, the byte to be written will be enabled from the buf-to-bank registers along with the unchanged bytes, corrected if necessary, from the EDAC chip 162 onto the RAM data bus 160. The resultant word will be written to memory along with the new check bits.

A cycle 5 (diagnostic disable correct read) operation is utilized to allow the diagnostic processor 46 to read RAM data without intervention from the EDAC chip 162. Likewise, cycle 6 (diagnostic disabled correct write) operations are utilized to write data and check bits stored in the buf-to-bank registers to memory bypassing the EDAC chip 162. This mechanism allows the diagnostic processor 46 to write any data or check bit pattern to memory for diagnosing the EDAC chip 162.

While the multiprocessor computer system of the present invention has been described with reference to its preferred embodiments, it will be understood that variations and modifications will occur to those skilled in the art from the foregoing detailed description and the accompanying drawings. In particular, the various modules, particularly the memory and processor modules can be modified to include different configurations of components (e.g. more than two processors on a processor module). These and all other such variations and modifications are intended to fall within the scope of the appended claims.

What is claimed is:

1. A multiprocessor computer system comprising:
a plurality of processor modules, each module having at least one processor and having coupling interface means through which data, addresses and interrupts are communicated to and from each processor module, said processor modules also including a cache memory means for storing contents of frequently accessed memory locations;
system memory means having coupling interfaces through which data and addresses are communicated to and from said system memory means, said system memory means is accessible to each of said processors;
operation control means for allocating and controlling the operation of a plurality of processes on said plurality of processors, said operation control means including timing means for generating timing signals that define successive transaction intervals;
system bus means connected to said coupling interfaces of said plurality of processor modules and to said coupling interfaces of said system memory means including:
 a) address bus means for transferring memory addressed from one of said plurality of processor modules to said system memory means;
 b) data bus means for transferring data from said system memory means to said plurality of processor modules and from said plurality of processor modules to said system memory means;
 c) vector bus means for transferring vectored interrupt signals between one of said plurality of processor modules and another of said plurality of processor modules, said vector bus means being independent from said address and said data bus means; said vector bus means further comprising means for segregating system components including processor modules, I/O modules and operation control means into a plurality of groups that may receive vectored interrupt signals and for providing an even distribution of vectored interrupt signals within said groups so that all groups of the same type of components receive a substantially even number of vectored interrupt signals;
 d) control line means for providing a path for signals to be transferred from said operation control means to said processor modules and said system memory means and from said processor modules and system memory means to said operation control means;
means for arbitrating access to each of said address, data and vector bus means;
whereby said operation control means allows said system to operate at high speeds by efficiently distributing processes to said processor modules which are tightly coupled.

2. A multiprocessor computer system comprising:
system memory means having coupling interfaces through which data and addresses are communicated to and from said system memory means;

a plurality of processor modules, each module being capable of gaining access to said system memory means and having at least two processors, said processor modules also including coupling interface means through which data, addresses and interrupts are communicated to and from said system memory means and to and from each of said processor modules, said processor modules further including a cache memory means shared by said at least two processors for storing contents of memory locations that are most frequently accessed by said at least two processors sharing said cache memory means, said cache memory means being a non-write through cache in which data to be written in cache memory locations is only written in cache locations;

operation control means for allocating and controlling the operation of a plurality of processes on said plurality of processors, said operation control means including timing means for generating timing signals that define successive transaction intervals;

system bus means connected to said coupling interfaces of said plurality of processor modules and to said coupling interfaces of said system memory means including:

a) address bus means for transferring memory addresses from one of said plurality of processor modules to said system memory means;

b) data bus means for transferring data from said system memory means to said plurality of processor modules and from said plurality of processor modules to said system memory means;

c) vector bus means for transferring interrupt signals between one of said plurality of processor modules and another of said plurality of processor modules said vector bus means being independent from said address and data bus means;

d) control line means for providing a path for signals to be transferred from said operation control means to said processor modules and said system memory means and from said processor modules and system memory means to said operation control means;

means for arbitrating access to each of said address, data and vector bus means;

whereby said operation control means allows said system to operate at high speeds by efficiently distributing processes to said processor modules which are tightly coupled.

3. The multiprocessor computer system of claim 2 further comprising means for indicating to a requester that data stored in a location in said system memory means is validly stored in only a non-write-through cache memory means.

* * * * *